United States Patent [19]

Tortorici et al.

[11] Patent Number: 4,940,744

[45] Date of Patent: Jul. 10, 1990

[54] INSOLUBILIZING SYSTEM FOR WATER BASED INKS

[75] Inventors: Frank J. Tortorici, Kingsport; Jimmy L. Nelson, Bristol, both of Tenn.

[73] Assignee: Eastman Kodak Company, Rochester, N.Y.

[21] Appl. No.: 171,336

[22] Filed: Mar. 21, 1988

[51] Int. Cl.$^5$ .......................... C08K 3/30; C08K 3/10; C08L 75/04

[52] U.S. Cl. .................................. 524/437; 524/419; 524/591; 427/154; 427/258; 427/260; 427/333; 427/340

[58] Field of Search ............... 524/839, 840, 591, 419, 524/437; 427/333, 340

[56] References Cited

U.S. PATENT DOCUMENTS

| | | | |
|---|---|---|---|
| T949,001 | 8/1976 | Pacifici | 427/341 |
| 3,734,874 | 5/1973 | Kibler et al. | 260/29.2 E |
| 3,779,993 | 12/1973 | Kibler et al. | 260/75 S |
| 4,079,028 | 3/1978 | Emmons | 528/67 |
| 4,148,779 | 4/1979 | Blackwell et al. | 260/40 R |
| 4,155,892 | 5/1979 | Emmons | 260/29.2 TN |
| 4,180,491 | 12/1979 | Kim | 260/29.2 TN |
| 4,233,196 | 11/1980 | Sublett | 260/29.2 N |
| 4,670,100 | 6/1987 | Henning | 524/840 |
| 4,704,309 | 11/1987 | Coney et al. | 427/258 |
| 4,772,491 | 9/1988 | Nealy | 427/336 |

OTHER PUBLICATIONS

Research Disclosure 24222, "Water-Resistant Coatings From Water-Dispersed Polymers", June 1984.
"Polymers, Resins and Monomers, Acrysol ® RM-825 Rheology Modifier for Coatings", Rohm and Haas.

Primary Examiner—C. Warren Ivy
Attorney, Agent, or Firm—Thomas R. Savitsky; William P. Heath, Jr.; Mark A. Montgomery

[57] ABSTRACT

An aqueous system for treating a film or coating containing water-dispersible polymeric material having water solubilizing sulfonate groups in its molecular structure, the system being effective for insolubilizing the sulfonate groups and enhancing the water resistance of the film, and having dispersed therein per 100 grams of water, from about 0.002 to about 0.5 gram-ion equivalents of a multivalent cation, and from about 0.1 to about 25.0 grams of water-dispersible polyurethane material, and preferably having a No. 2 Zahn cup viscosity of from about 15 to about 50 seconds.

13 Claims, No Drawings

INSOLUBILIZING SYSTEM FOR WATER BASED INKS

This invention concerns the use of water-dispersed polyurethane which when used as a thixotrope, yields the desired surface energy and viscosity in an aqueous system containing multivalent cation derived for example, e.g., from alum, $Al_2(SO_4)_3$, to post-treat certain water-dispersible polymer based films for improving the water resistance thereof, particularly on nonporous substrates.

Many of the present commercial printing operations utilize inks containing water-based latices of polymers such as acrylics, polyvinyl acetate, or butadiene-styrene which form water-resistant films by evaporation of the water and coalescence of the polymer spheres. Also common are inks based on water solutions of ammoniated or aminated carboxyl-containing polymers which form water-resistant films by evaporation of the water and dissipation of the ammonia or amine moieties.

Recent developments in the printing ink field concern special aqueous ink systems based on certain water-dissipatable or dispersible polyester or polyesteramide materials containing water solubilizing sulfonate groups, which inks can, in large part, supplant present commercial inks. It is known to be an important feature of these systems that printed film solids thereof can be precipitated to thereby enhance the binding of the solids to the substrates and thus improve water resistance of the film. This precipitation is achieved by contacting the film with an aqueous solution of a multivalent cation such as the $Al^{+3}$ ion of aqueous aluminum sulfate solution. In this regard, see the accompanying Research Disclosure 24222 dated June 1984, and Defensive Publication T 949,001 published 8-3-76 in 949 G.8.

In actual practice, however, the application of the cation solution is not a simple matter. In high speed printing operations, for example, the retention of an aqueous solution on the printed film for the requisite period is troublesome and trade off between expediency and desired degree of precipitation of the film solids often must be made. The present invention has among its principal objectives therefore, to provide a means whereby a more controlled and regulatable application of the cation to the film can be made.

This and further objects hereinafter appearing have been attained in accordance with the present invention which is defined as an aqueous system for treating film of water dispersible polymeric material containing water solubilizing sulfonate groups, said aqueous system being effective for insolubilizing said groups and enhancing the water resistance of the film, and having dispersed therein per 100 grams of water from about 0.002 to about 0.5 gram ion equivalents of a multivalent cation, and from about 0.1 to about 25.0 grams of water dispersible polyurethane material. It is highly preferable that the system have a No. 2 Zahn cup viscosity of from about 15 to about 50 seconds.

This system, as will become more fully illustrated below, is readily applied to and retained on the film for the period necessary for complete insolubilization of the polymeric material for maximum development of water resistance.

It is preferred to employ from about 0.005 to about 0.2, and most preferably from about 0.01 to about 0.1 gram ion equivalents per 100 grams of water of the cation, and from about 0.5 to about 10.0 grams of the polyurethane material. The gram-ion equivalents is calculated as follows:

$$\frac{\text{g of M-salt}}{\text{M.W. of M-salt}} \times \text{M-valence} = \text{g-ion equivalents } (M^+).$$

For example, for 5 weight % alum, the calculation would be $$\frac{5 \text{ g } Al_2(SO_4)_3}{156} \times 3 = 0.096 \, (M^+).$$

As used herein when describing the polyurethane, the term "hydrophilic" refers to polyether groups that are residues of a polyol reactant; the term "hydrophobic" refers to all portions or segments of the polyurethane other than the residues of polyether polyol reactants, such hydrophobic groups include residues of non-polyether hydroxy compounds, amines, and/or isocyanates; and the term "hydrophobic branching groups" refers to either external (terminal) or internal hydrophobic groups (i.e. hydrophobic groups).

The polyurethanes useful in the present invention are nonionic and include those disclosed in U.S. Pat. Nos. 4,180,491; 4,155,892; and 4,079,028, the disclosures of which are incorporated herein by reference. In these polymers, as stated, for example, in U.S. Pat. No. 4,079,028, the polyether segments have molecular weights of at least 1500 (preferably 3,000–20,000), the polymers contain, on the average, at least three hydrophobic groups and at least two water soluble polyether segments linking the hydrophobes, the sum of the carbon atoms in the hydrophobic groups being at least 20, preferably at least 30, and the total molecular weight is about 10,000–200,000, preferably 12,000–150,000. The optimum polyether content will depend, of course, on the bulk and distribution of the hydrophobic groups in the polymer. Whereas a total polyether molecular weight of 4,000–5,000 may be suitable when the polymer contains small external and internal hydrophobes, the polyether content may have to be substantially increased when heavier and/or more extensively branched hydrophobic groups are to be built into the polymer, such as long chain fatty polyols or amines. About 200 carbon atoms in the hydrophobic portion is the practical upper limit although it will be understood that it is a relative matter since the proportion of polyether may be increased to offset increased hydrophobicity. However, as total molecular weight increases the viscosity increases and ease of handling decreases, and therefore the economic usefulness of the products is substantially diminished.

In preferred embodiments of the present invention, the polyurethane has a molecular weight of at least 10,000 and at least three hydrophobic branching groups, the hydrophobic groups containing a total of at least 20 carbon atoms and being linked through hydrophilic polyether segments of from about 3,000 to about 20,000 molecular weight each; wherein the polyurethane thickener is selected from the following reaction products wherein reactant (a) is at least one water-soluble polyether polyol containing at least three hydroxyl groups, reactant (b) is at least one water-insoluble organic diisocyanate, reactant (c) is at least one water-insoluble organic poly-isocyanate containing at least three isocyanate groups, reactant (d) is at least one hydrophobic organic monofunctional active hydrogen compound, reactant (e) is at least one hydrophobic organic monoisocyanate, and reactant (f) is at least one polyhydric alcohol or polyhydric alcohol ether containing three or more hydroxyl groups:

(I) reaction products of reactants (a) and (e),
(II) reaction products of reactants (a), (c) and (d)
(III) reaction products of reactants (a), (b), (d) and (f),
(IV) reaction products of reactants (a), (b), (e) and (d),
(V) reaction products of reactants (a), (b), (c) and (d),
(VI) reaction products of reactants (b), (e) and (f),
(VII) reaction products of reactants (a), (c) and (e),
(VIII) reaction products of reactants (b), (d) and (f).

The most preferred polyurethane materials are selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide dimer acid diisocyanate/polyethylene glycol condensate capped with octadecyl isocyanate, a polyethylene glycol/4,4'-methylenebis(isocyanatocyclohexane)/triisocyanatae adduct of trimethylol propane and tolylene dissocyanate capped with hexadecanol, a polyethylene glycol/-methylenedi p phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentacrythritol condensate capped with octadecanol, and a polyethylene glycol/trimethylol propane/tolylene diisocyanate condensate capped with perfluorododecanol.

A highly preferred polyurethane material is the 25% active material comprised of about 24–26 weight percent polyurethane, about 18–19 weight percent diethylene glycol monobutyl ether and about 56–57 weight percent water, as sold by Rohm and Haas Company under the Trademark ACRYSOL® RM-825. This material is described in the Trade Sales Coatings brochure entitled "Polymers, Resins and Monomers, ACRYSOL® RM-825 Rheology Modifier for Coatings," ® Rohm and Haas Company, 1985.

By means of the present post treatment process the ink solids can be brought rapidly and completely out of dispersion. The polymer precipitate carries with it essentially all of the water insoluble components including colorants, both pigments and dyes, that are dispersed, sequestered or entrained in the polymer.

Essentially all multivalent cations will work but there are a number of preferred requirements for the cation-/anion material: (a) it must be nontoxic to humans and to the environment in general; (b) it must be available in a water soluble form that is stable in water; (c) it must be nonradioactive; (d) it must be readily available; and (e) it must be noncorrosive to commercially used metals, alloys, and plastics. Specific examples of useful compounds include, but are not limited to, aluminum sulfate, calcium chloride, magnesium sulfate, zinc chloride, and the like, with aluminum sulfate being preferred. In general, cations of elements in Groups IIA, IIIB, IVB, VB, VIB, VIIB, VIII, IB, IIB, and IIIA of the Periodic Table of Elements are suitable if they meet the above requirements, (a) through (e). Such insolubilizing cations are disclosed in Defensive Publication T949,001 cited above. Also useful are the polyvalent cationic organic species such as quaternized polyamine materials typified by the quaternized benzothiazole basic dye "Thioflavin T" (C.I. 49005).

It is noted that the monovalent sulfonate cation of the above water-dispersible polymer can be any of $H^+$, $Na^+$, $K^+$, $Li^+$, or the cations of primary, secondary or tertiary aliphatic or arylamines. The water dispersible printing inks may be prepared, for example, as disclosed in U.S. Pat. No. 4,148,779 incorporated herein by reference. The polymers are prepared as disclosed in U.S. Pat. Nos.: 3,734,874; 3,779,993; and 4,233,196, the disclosures of which are incorporated herein by reference. These polymers are formulated, for example, into water based flexographic, gravure, and screen process printing inks, which advantageously, upon drying in the press maintain a sufficient degree of water dispersibility to allow rapid rewetting of the rolls and plates on restarting of the press and to allow easy cleanup of the press with water, especially soapy water.

The following examples will further illustrate preparations of water dissipatable or dispersible polyester materials to which the present invention is applicable.

EXAMPLE A

Polyester Preparation

A mixture of 79.5 g (0.41 mole) of dimethyl isophthalate, 26.6 g (0.09 mole) of dimethyl-5-sodiosulfoisophthalate, 54.1 g (0.51 mole) of diethylene glycol, 37.4 g (0.26 mole) of 1,4-cyclohexanedimethanol, 1.4 mL of a 1.0% (based on Ti) catalyst solution of titanium tetraisopropoxide, and 0.74 g (0.009 mole) of sodium acetate buffer is stirred and heated for two hours at 200°–220° C. The temperature is then raised to 275° C. and a vacuum of 0.3 mm is applied. Heating and stirring is continued for 1 hour under these conditions. After cooling, the polymer obtained has an I.V. of 0.36 and is tough and rubbery and is dissipatable in hot water to the extent of about 25 weight percent to give a clear, slightly viscous solution. The composition of the acid moieties of this polyester material is analyzed to be 82 mole percent isophthalic acid residue and 18 mole percent 5-sodiosulfoisophthalic acid residue, and of the glycol moieties is analyzed to be 54 mole percent diethylene glycol and 46 mole percent 1,4-cyclohexanedimethanol.

EXAMPLE B

Polyesters designated (a), (b), (c) and (d) are prepared essentially in accordance with Example 1 of the aforementioned U.S. Pat. No. 4,233,196 from the following materials:

| (a) | g. moles |
|---|---|
| Dimethyl Isophthalate (IPA) | 0.415 |
| Dimethyl-5-Sodiosulfoisophthalate (SIP) | 0.085 |
| 1,4-Cyclohexanedimethanol (CHDM) | 0.520 |
| Carbowax 1000 (CW 1000) | 0.0237 |
| Sodium Acetate | 0.0085 |
| Irganox 1010 | 0.0085 |

The Carbowax 1000 has the structure: H(OCH$_2$—CH$_2$)$_n$OH wherein n is about 22. The polymer analyzed by NMR contains (in reacted form) about 3 mole percent IPA, about 17 mole percent SIP, about 94.5 mole percent CHDM, and about 5.5 mole percent of CW 1000, and has an I.V. of about 0.39.

| (b) | g. moles |
|---|---|
| Dimethyl Isophthalate | 0.328 |
| Dimethyl-5-Sodiosulfoisophthalate | 0.072 |
| 1,4-Cyclohexanedimethanol | 0.442 |
| Carbowax 400 (n = 10) | 0.058 |
| Sodium Acetate | 0.0072 |

The polymer as analyzed by NMR contains (in reacted form) about 82 mole percent IPA, about 8 mole percent SIP, about 85.5 mole percent CHDM and about 14.5 mole percent CW 400, and has an I.V. of about 0.46.

| (c) | g. moles |
|---|---|
| Dimethyl Isophthalate | 0.41 |
| Dimethyl-5-Sodiosulfoisophthalate | 0.09 |
| 1,4-Cyclohexanedimethanol | 0.55 |
| Carbowax 4000 (n = 90) | 0.0005 |
| Sodium Acetate | 0.009 |

The polymer as analyzed by NMR contains (in reacted from) about 82 mole precent IPA, about 18 mole precent SIP about 99.9 mole precent CHDM and about 0.1 mole precent CW 4000, and has an I.V. of about 0.16.

| (d) | g. moles |
|---|---|
| Dimethyl Isophthalate | 0.205 |
| Dimethyl-5-Sodiosulfoisophthalate | 0.045 |
| Ethylene Glycol (EG) | 0.9638 |
| Carbowax 2000 (n = 45) | 0.03625 |
| Sodium Acetate | 0.0045 |

The polymer as analyzed by NMR contains (in reacted form) about 82 mole precent IPA, about 18 mole precent SIP, about 85.5 mole percent EG and about 14.5 mole percent CW 2000, and has an I.V. of about 0.34.

In such polymers containing the Carbowax material, the n value is preferably between about 6 and 150.

The inherent viscosities (I.V.) of the particular polyester materials useful herein range from about 0.1 to about 1.0 determined according to ASTM D2857-70 procedure, in a Wagner Viscometer of Lab Glass, Inc. of Vineland, N.J., having a ½ mL capillary bulb, using a polymer concentration about 0.25% by weight in 60/40 by weight of phenol/tetrachloroethane. The procedure is carried out by heating the polymer/solvent system at 120° C. for 15 minutes, cooling the solution to 25° C. and measuring the time of flow at 25° C. The I.V. is calculated from the equation $$(n)^{25° C.}_{0.50\%} = \frac{\ln \frac{t_s}{t_o}}{C}$$

where:
(n) = inherent viscosity at 25° C. at a polymer concentration of 0.25 g/100 mL of solvent;
$l_n$ = natural logarithm;
$t_s$ = sample flow time;
$t_o$ = solvent-blank flow time; and
C = concentration of polymer in grams per 100 mL of solvent = 0.25.

The units of the inherent viscosity throughout this application are in deciliters/gram. It is noted that higher concentrations of polymer, e.g., 0.50 g of polymer/100 mL solvent may be employed for more precise I.V. determinations.

In more preferred and specific embodiments the invention comprises the post-treatment process defined above wherein the printing operation is carried out with an ink comprising an aqueous system of dye and/or pigment and water-dispersible polymer having carbonyloxy linking groups in the linear molecular structure wherein up to 80% of the linking groups may be carbonylamido linking groups, the polymer having an inherent viscosity of from about 0.1 to about 1.0 measured in a 60/40 parts by weight solution of phenol/tetrachloroethane at 25° C. and at a concentration of about 0.25 gram of polymer in 100 mL of the solvent, the polymer containing substantially equimolar proportions of acid equivalents (100 mole percent) to hydroxy and amino equivalents (100 mole percent), the polymer comprising the reaction products of (a), (b), (c) and (d) from the following components or ester-forming or esteramide-forming derivatives thereof:

(a) at least one difunctional dicarboxylic acid;
(b) from about 4 to about 25 mole percent, based on a total of all acid, hydroxyl and amino equivalents being equal to 200 mole percent, of at least one difunctional sulfomonomer containing at least one sulfonate group attached to an aromatic or cycloaliphatic nucleus wherein the functional groups are hydroxy, carboxyl or amino;
(c) at least one difunctional reactant selected from a glycol or a mixture of a glycol and diamine having two —NRH groups, the glycol containing two —CH$_2$—OH groups of which (A) at least 15 mole percent based on the total mole percent of hydroxy or hydroxy and amino equivalents, is a poly(ethylene glycol) having the structural formula H—(OCH$_2$—CH$_2$)$_n$OH n being an integer of between 2 and about 20, or (B) of which from about 0.1 to less than about 15 mole percent based on the total mole percent of hydroxy or hydroxy and amino equivalents, is a poly(ethylene glycol) having the structure formula H—(OCH$_2$—CH$_2$)$_n$OH, n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH, an animocarboxylic acid having one —NRH group, an amino-alcohol having one —C(R)$_2$—OH group and one —NRH group or mixtures thereof, wherein each R in the (c) or (d) reactants is a hydrogen atom or an alkyl group of 1 to 4 carbon atoms.

In the above polymeric material it is preferred that very minor, e.g, less than about 10 mole % based on all reactants, of reactant (d) is employed, that at least about 70 mole % of reactant (c) is glycol, and that at least about 70 mole % of all hydroxy equivalents is present in the glycol.

Preferred inks for use with the present invention are characterized as follows:

the pigment material is dispersed in the polymeric material in a weight ratio with respect to the total of the polymeric material of from about 1/100 to about 4/1, and the polymeric material is prepared from (a) an acid component (moiety) of from about 75 to about 84 mole % isophthalic acid and conversely from about 25 to about 16 mole % 5-sodiosulfoisophthalic acid, and from a glycol component (moiety) of from about 45 to about 60 mole % diethylene glycol and conversely from about 55 to about 40 mole % 1,4-cyclohexanedimethanol or ethylene glycol;

the inherent viscosity of the polymeric material is from about 0.28 to about 0.35, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol;

the pigment is one or a mixture of the following color index materials according to their generic names, specific details of these pigments being given in copending Ser. No. 864,996, now U.S. Pat. No. 4,186,815 the disclosure of which is incorporated herein by reference: C.I. Pigment Yellow 17; C.I. Pigment Blue 27; C.I. Pigment Red 49:2; C.I. Pigment Red 81:1; C.I. Pigment Red 81:3; C.I. Pigment Red 81:x; C.I. Pigment Yellow 83; C.I. Pigment Red 57:1; C.I. Pigment Red 49:1; C.I. Pigment Violet 23; C.I. Pigment Green 7; C.I. Pigment Blue 61; C.I. Pigment Red 48:1; C.I. Pigment Red 52:1; C.I. Pigment Violet 1; C.I. Pigment White 6; C.I. Pigment Blue 15; C.I. Pigment Yellow 12; C.I. Pigment Blue 56; C.I. Pigment Orange 5; C.I. Pigment Black 7; C.I. Pigment Yellow 14; C.I. Pigment Red 48:2; or C.I. Pigment Blue 15:3;

the polymeric material is dispersed in water and comprises from about 1% to about 50% by weight of total aqueous dispersion, preferably from about 10% to about 40% by weight of the total aqueous dispersion; and the aqueous dispersion is coated or printed onto a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide or polystyrene.

The inks dry rapidly upon printing but have long "open" times in a container open to the atmosphere, such as a printing press fountain. The inks wet surfaces well and have excellent adhesion to a large variety of substrates including plastic films, aluminum foil and paper. Both the 100% solid polymers and the corresponding aqueous dispersion may be pigmented by conventional techniques, and high gloss prints may be obtained therefrom.

In preparing the present inks, the following procedure is preferred for dispersing the polymers in water: The water should be preheated to about 180° F. to abut 200° F. and the polymer pellets added rapidly to the vortex under high shear stirring. A Cowles Dissolver, Waring Blender, or similar equipment may be used. Once the water is heated to the desired temperature, additional heat input is not required. Depending upon the volume prepared, dispersion of the pellets should be complete within 15 to 30 minutes stirring. Continued agitation with cooling may be desirable to prevent thickening at the surface due to water evaporation. Viscosities of these initial dispersions remain low up to polymer levels of 25% to 30% and viscosities increase sharply above these levels. These viscosities will be influenced by the degree of polymer dispersion obtained which is affected by the dispersing temperature, shear, and time. The polymer content typically ranges from about 15% to about 50% by weight of the dispersion with the preferred for most applications being from about 26% to about 38%. The polymer content of the finished ink typically ranges from about 15% to about 40% by weight of the ink, with from about 17% to about 25% being preferred.

The finished ink may be prepared as follows: The pigment is added to the above initial polymer dispersions, and at a properly adjusted viscosity, dispersed thereinto with ball mill, sand mill, high shear fluid flow mill, Cowles Dissolver, Katy Mill or the like. The pigments also may be dispersed directly in the polymer by milling on a heated two roll mill at about 220° F. to 360° F. and using processing aids as desired, such as solvents or plasticizers. The viscosities and printing characteristics of the ink may be modified further by addition of water, solvents, plasticizers, sequestered wax, surfactants and the like to suit the particular printing needs.

The ink is prepared as above described comprising the following: 100 g of polymer having an I.V. of about 0.35 and a No. 3 Zahn Cup viscosity of 25 seconds prepared from 88 moles of isophthalic acid, 12 moles of 5-sodiosulfoisophthalic acid, 8 moles of ethylene glycol, and 92 moles of diethylene glycol; 100 g of Diarylide Yellow pigment; 240 g of water; and 60 g of ethanol.

The post treating solution is prepared, typically, as follows: Alum $[AL_2(SO_4)_3 \cdot (14-18)H_2O]$, e.g., at a concentration of from 0.5 to 5.0 parts by weight is added to 100 parts of water and dissolved therein by simple agitation. To this solution is added the polyurethane material, preferably as a solvent dispersion, e.g., 25% by weight polyurethane as typified by the aforementioned Acrysol RM-825. The resultant post treatment system should have a No. 2 Zahn cup viscosity of from about 25 to about 34 seconds.

The following example will further illustrate the invention:

The solid polymer (32 parts) of Example A is dispersed in approximately 68 parts of deionized water at 85° to 95° C. and 0.2 parts of biocide (Tektamer 38 AD) added. To 70 parts of this dispersion is added 30 parts of the titanium dioxide pigment, C.I. 6, at high-speed agitation for five minutes on a Waring Blender. The mixture is then milled in an Eiger mill operated at about 5,000 rpm for about 7.5 minutes to further reduce the pigment for a grind of from about "2" to about "0" NPIRI grind gauge. The resulting composition has a pH of about 6.6 and a viscosity of 26 to 29 seconds on a No. 2 Zahn cup determined according to ASTM D-4212-82. To 90 parts by weight of this composition is added 10 parts by weight of n-propanol. This ink is reduced to a press-ready viscosity of 22 seconds (No. 2 Zahn cup) with deionized water. Samples of this ink are applied with a flexographic hand proofer employing a 180 line anilox roll on aluminum foil and allowed to air dry for two hours.

To one air dried sample is brush applied a post treatment system of the present invention comprising 100 parts water having dispersed therein about 1.5 parts of alum, and about 60 parts of 25% active Acrysol RM 825. After a few seconds the sample is water rinsed and allowed to air dry for one hour. This post treated sample and a non treated control are rubbed equally with a water wet cloth. The coating rubbed easily off of the control sample while the post treated sample was essentially inaffected.

The invention has been described in detail with particular reference to preferred embodiments thereof, but it will be understood that variations and modifications can be effected within the spirit and scope of the invention.

We claim:

1. An aqueous system for treating a film or coating containing water dispersible polymeric material having water solubilizing sulfonate groups in its molecular structure, said system being effective for insolubilizing said groups and enhancing the water resistance of the film or coating and having dispersed therein per 100 grams of water, from about 0.0002 to about 0.5 gram-ion equivalents of a multivalent cation, and from about 0.1 to about 25.0 grams of nonionic water-dispersible polyurethane material.

2. The system of claim 1 containing from about 0.005 to about 0.2 gram ion equivalents of a multivalent cation, and having a No. 2 Zahn cup viscosity of from about 25 to about 50 seconds.

3. The system of claim 1 wherein the polyurethane material has a molecular weight of at least 10,000 and at least three hydrophobic branching groups, the hydrophobic groups containing a total of at least 20 carbon atoms and being linked through hydrophilic polyether segments of from about 3,000 to about 20,000 molecular weight each.

4. The system of claim 1 wherein the polyurethane material is selected from the reaction products I through V wherein reactant (a) is at least one water-soluble hydrophilic polyether polyol containing at least three hydroxyl groups, reactant (b) is at least one water-insoluble hydrophobic organic diisocyanate, reactant (c) is at least one water-insoluble hydrophobic organic poly-isocyanate containing at least three isocyanate groups, reactant (d) is at least one hydrophobic organic monofunctional active hydrogen compound, and reactant (e) is at least one hydrophobic organic monoisocyanate, (I) reaction products of reactants (a) and (e),
(II) reaction products of reactants (a), (c), and (d),
(III) reaction products of reactants (a), (b), (c), and (d),
(IV) reaction products of reactants (a), (b), (d), and (e),
(V) reaction products of reactants (a), (c), and (e), 5. The system of claim 1 wherein the polyurethane material is selected from a trimethylol propane/ethylene oxide adduct capped with octyldecyl isocyanate, a dipentaerythritol/ethylene oxide adduct capped with octyldecyl isocyanate, a trimethylol propane/ethylene oxide adduct reacted with a tolylene diisocyanate polyethylene glycol condensate and capped with octadecanol, a trimethylol propane/ethylene oxide/C36 dimer acid diisocyanate/polyethylene glycol condensate capped with octadecyl isocyanate, a polyethylene glycol/4,4'-methylene bis(isocyanatocyclohexane)/triisocyanate adduct of trimethylol propane and tolylene dissocyanate capped with hexadecanol, a polyethylene glycol/methylenedi-p-phenylene diisocyanate/triisocyanate adduct of trimethylol propane and tolylene diisocyanate condensate capped with eicosanol, a polyethylene glycol/tolylene diisocyanate/polymethylene polyphenylisocyanate condensate capped with octadecanol, a polyethylene glycol/trimethylol propane/tolylene diisocyanate condensate capped with octadecanol, a polyethylene glycol/tolylene diisocyanate/dipentaerythritol condensate capped with octadecanol, and a polyethylene glycol/trimethylol propane/tolylene diisocyanate condensate capped with perfluorododecanol.

6. The process for enhancing the water resistance of a film or coating containing water-dispersible polymeric material having water solubilizing sulfonate groups in its molecular structure, comprising contacting said film or coating with a system as defined in anyone of claims 1-5.

7. The process of claim 6 wherein the water-dispersible polymer contains carbonyloxy linking groups in its linear molecular structure wherein up to 80% of the linking groups may be carbonyl amido linking groups, the polymer having an inherent viscosity of from about 0.1 to about 1.0 measured in a 60/40 parts by weight solution of phenol/tetrachloroethane at 25° C. and at the concentration of about 0.25 gram of polymer in 100 mL of the solvent, the polymer containing substantially equimolar proportions of acid equivalents (100 mole percent) to hydroxy and amino equivalents (100 mole percent), the polymer comprising the reaction products of (a), (b), (c), and (d) from the following components or ester forming or esteramide forming derivatives thereof:

(a) at least one difunctional dicarboxylic acid;
(b) from about 4 to about 25 mole percent, based on a total of all acid, hydroxyl and amino equivalents being equal to 200 mole percent, of at least one difunctional sulfomonomer containing at least one sulfonate group attached to an aromatic or cycloaliphatic nucleus wherein the functional groups are hydroxy, carboxyl or amino;
(c) at least one difunctional reactant selected from a glycol or a mixture of a glycol and diamine having two —NRH groups, the glycol containing two —CH$_2$—OH groups of which (A) at least 15 mole percent based on the total mole percent of hydroxy or hydroxy and amino equivalents, is a poly(ethylene glycol) having the structural formula

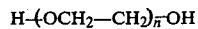

n being an integer of between 2 and about 20, or (B) of which from about 0.1 to less than about 15 mole percent based on the total mole percent of hydroxy or hydroxy and amino equivalents, is a poly(ethylene glycol) having the structure formula

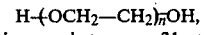

n being an integer of between 2 and about 500, and with the proviso that the mole percent of said poly(ethylene glycol) within said range is inversely proportional to the quantity of n within said range; and (d) from none to at least one difunctional reactant selected from a hydroxycarboxylic acid having one —C(R)$_2$—OH, an aminocarboxylic acid having one —NRH group, an amino-alcohol having one —C(R)$_2$—OH group and one —NRH group or mixtures thereof, wherein each R in the (c) or (d) reactants is a H atom or an alkyl group of 1 to 4 carbon atoms.

8. The process of claim 6 wherein the water-dispersible polymer contains less than about 10 mole % based on all reactants, of reactant (d), that at least about 70 mole % of reactant (c) is glycol, and that at least about 70 mole % of all hydroxy equivalents is present in the glycol.

9. The process of claim 6 wherein the water-dispersible polymer is prepared from (a) an acid component (moiety) of from about 75 to about 84 mole % isophthalic acid and conversely from about 25 to about 16 mole % 5-sodiosulfoisophthalic acid, and from a glycol component (moiety) of from about 45 to about 60 mole % diethylene glycol and conversely from about 55 to about 40 mole % 1,4-cyclohexanedimethanol or ethylene glycol.

10. The process of claim 6 wherein the water-dispersible polymer has an inherent viscosity of from about 0.28 to about 0.35, the said acid component (moiety) comprises from about 80 to about 83 mole % isophthalic acid and conversely from about 20 to about 17 mole % 5-sodiosulfoisophthalic acid, and the said glycol component (moiety) comprises from about 52 to about 56 mole % diethylene glycol and conversely from about 48 to about 44 mole % 1,4-cyclohexanedimethanol.

11. The process of claim 6 wherein the coating is on a substrate selected from metal foil, newsprint, bleached and unbleached Kraft paper, clay coated paper, glass, calendered paper, stainless paper, paper board, and films or other substrates of polyester, polycarbonate, cellulose ester, regenerated cellulose, poly(vinylidene chloride), polyamide or polystyrene.

12. The process of claim 6 wherein the multivalent cation is $Al^{+3}$.

13. An aqueous system for treating a film or coating containing water-dispersible polymeric material having water solubilizing sulfonate groups in its molecular structure, said system being effective for insolubilizing said groups and enhancing the water resistance of the film or coating having dispersed therein per 100 grams of water from about 0.005 to about 0.2 gram-ion equivalents of a multivalent cation, and from about 0.1 to about 25 grams of nonionic water-dispersible polyurethane material, wherein the system has a No. 2 Zahn cup viscosity of about 25 to about 34 seconds.

* * * * *